B. C. SHAW.
Running-Gear for Wagons.

No. 216,534. Patented June 17, 1879.

Attest:
Byron A. Tyler
D. F. Speed

Inventor:
Benjamin C. Shaw
Per E. C. Frink
his Attorney

UNITED STATES PATENT OFFICE.

BENJAMIN C. SHAW, OF INDIANAPOLIS, INDIANA.

IMPROVEMENT IN RUNNING-GEAR FOR WAGONS.

Specification forming part of Letters Patent No. 216,534, dated June 17, 1879; application filed December 27, 1878.

*To all whom it may concern:*

Be it known that I, BENJAMIN C. SHAW, of Indianapolis, in the county of Marion and State of Indiana, have invented a new and useful Improvement in Wagons, of which the following is a description, reference being had to the accompanying drawings.

My invention relates to a device for the simultaneous change of direction of all four wheels of a vehicle by each movement laterally of the front end of the wagon-tongue.

The object of my invention is to provide a jointed extension sliding swiveled reach, uniting the front and rear hounds of a wagon, and operated by the lateral movement of the wagon-tongue, whereby the rear and front axles are turned on their respective king-bolts in opposite direction, causing the rear and front wheels on one side of the wagon to cramp and strike wear-irons on the side of the wagon-box, while the wheels on the other side of the wagon take a reverse direction, thus causing the wagon to make a very short turn, and the jointed swivel sliding extension reach moving laterally at the joint, and rotating in the sliding box when the wagon-gear is twisted by reason of the uneven surface of the ground, does not interfere with the cramping of the wagon, and the stationary part of the jointed bar, by being permanently attached to the front gearing on the top side of the slider, holds up the pivoted joint of the cramping-reach, and supports the rear hounds, thus preventing any interference with the draft-reach in turning.

My invention consists, first, in the new construction and arrangement of the metallic slide-block; and, second, in the new combination of the metallic slide-block and the sliding jointed reach, as will be hereinafter fully described and set forth.

Figure 1:
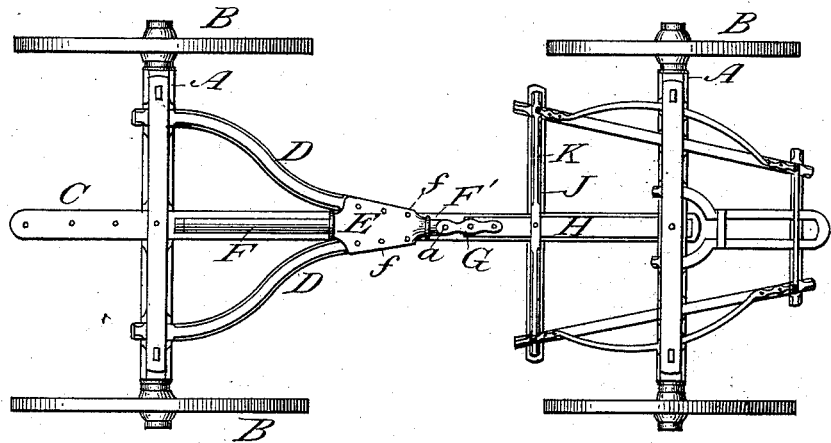
Figure 2:
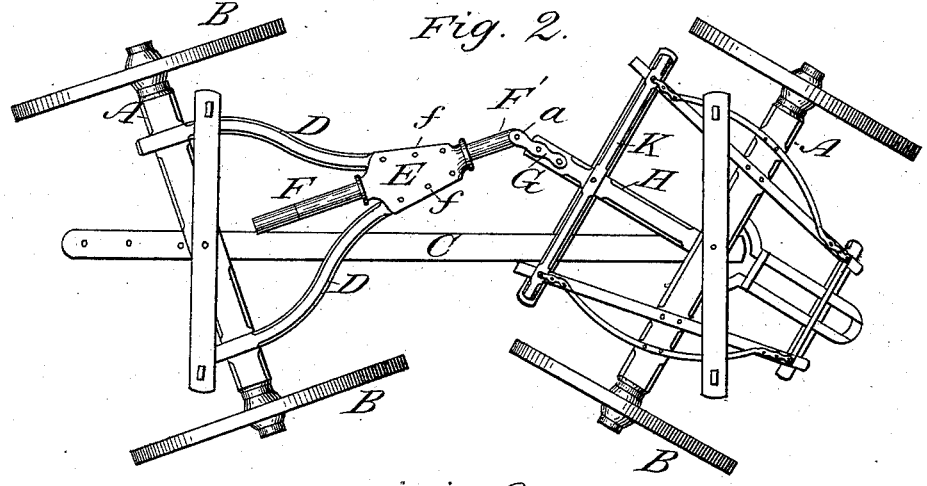
Figure 3:

In the accompanying drawings, in which like letters of reference in the different figures indicate like parts, Figure 1 represents a plan view of my improved jointed sliding extension swiveled reach, showing its relative position when the wheels of the vehicle are moving in a direct line. Fig. 2 is a plan view of the same, showing the relative position of the jointed reach when the wheels are cramped, as in turning, and the manner in which the jointed reach and rear hounds are supported. Fig. 3 represents a cross-section of the metallic slide-block.

Referring to the drawings, B B represent the wheels, mounted on the axles A, with sand-board, bolsters, and long-draft reach C, of ordinary construction.

The metallic slide-block E is provided at each side with flanges $x\ x$, which project over the top of the wooden hounds D D. Said flanges $x\ x$ are provided with bolt-holes to receive the bolts $f$, said bolts passing through corresponding holes in the ends of the wooden hounds D D and made fast, thus securing the front ends of the wooden hounds in the angular part of the block E, formed by the flanges $x\ x$ and that part, $E^2$, which projects downward below the hounds. The rear ends of said wooden hounds are secured to the rear axle, as shown.

The central longitudinal part of the block E, that projects downward between the front ends of the hounds D D, is provided with a round hole, $E^3$, extending through the same from end to end between the hounds, forming a guide for the round pipe or rod F to operate in.

The front end of the rod F is provided with a flat head, F', having a vertical bolt-hole to receive the pin or bolt $a$. The head F' is fitted to operate between two plates, G, that are secured to the top and bottom sides of the bar H, said plates G having corresponding holes to receive the bolt or pin $a$, thus forming a jointed reach that is free to slide and rotate in the block F to suit the motion caused by the lateral movement of the tongue or the twisting of the gear when passing over uneven ground or in turning.

The bar H, that forms the stationary part of the jointed reach, is secured to the center of the front sand-board, and further secured to the top of the slider K, forming an extension of the lever or tongue to the pivoted point $a$ of the cramping-reach, thus holding the bar H in line with the tongue laterally, and at the same time supporting the jointed reach and the rear hounds. The rear and front hounds are securely attached together by means of the draft-pole C, the front end of which is pivoted between the sand-board and axle by the front king-bolt, and the rear end passing through or under the hind axle and pivoted by a king-bolt that passes through the hind bolster and axle and through coupling-holes in said pole C, said holes being arranged for coupling the wagon to any desired length. The front hounds are united together at the rear ends by the slide-bar K above and another bar below, leaving a space between them to receive the long draft-pole C, thus permitting the slider K to move laterally on the pole C; and the pole C supports the slider K and prevents the rear end of the front hounds from dropping, and also sustains the jointed reach E F H and the rear hounds, thereby preventing a strain on the front king-bolt common to the ordinarily-constructed wagon. The wheels, when cramped, as in turning, naturally throw the joint of the sliding reach far beyond the central line sidewise of the draft-pole C, and while in such a position, if the wheels enter ruts or pass over any obstruction, the gearing may be twisted; but the rotary motion of the rod F in the block E prevents the gear from binding, while the pole C gives steady draft.

I am aware that prior to my invention wagons have been made with sliding reaches, and that jointed reaches of various kinds have also been used for the purpose of making the rear wheels track with the front wheels; also, that sliding jointed reaches have been made operating in a portion of the hound, so as to rotate or twist in the hound, and to such devices I make no broad claim.

What I claim as new, and desire to secure by Letters Patent, is—

1. The metallic block E, provided with side flanges, $x\ x$, and a central downward-projecting part, $E^2$, having a round hole, $E^3$, extending through the same longitudinally from end to end, as and for the purpose specified.

2. The metallic block E, provided with side flanges, $x\ x$, and a central downward-projecting part, $E^2$, having a round hole, $E^3$, extending through the same longitudinally from end to end, combined with the round rod F and bar H, as and for the purpose specified.

In testimony whereof I have signed my name to this specification in the presence of two subscribing witnesses.

BENJAMIN C. SHAW.

Witnesses:
E. O. FRINK,
D. F. SPEES.